United States Patent
Chun et al.

(10) Patent No.: US 10,932,224 B2
(45) Date of Patent: Feb. 23, 2021

(54) METHOD AND USER EQUIPMENT FOR RECEIVING DATA, AND METHOD AND BASE STATION FOR TRANSMITTING DATA

(71) Applicant: LG ELECTRONICS INC., Seoul (KR)

(72) Inventors: Sungduck Chun, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 16/071,814

(22) PCT Filed: Jan. 20, 2017

(86) PCT No.: PCT/KR2017/000739
§ 371 (c)(1),
(2) Date: Jul. 20, 2018

(87) PCT Pub. No.: WO2017/126942
PCT Pub. Date: Jul. 27, 2017

(65) Prior Publication Data
US 2019/0021069 A1    Jan. 17, 2019

Related U.S. Application Data

(60) Provisional application No. 62/281,198, filed on Jan. 21, 2016.

(51) Int. Cl.
*H04W 76/27* (2018.01)
*H04W 76/10* (2018.01)
(Continued)

(52) U.S. Cl.
CPC ............ *H04W 68/02* (2013.01); *H04W 4/70* (2018.02); *H04W 36/0022* (2013.01);
(Continued)

(58) Field of Classification Search
CPC ... H04W 4/70; H04W 36/0022; H04W 68/02; H04W 76/10; H04W 76/18; H04W 76/20; H04W 76/27; H04W 80/02
See application file for complete search history.

(56) References Cited

U.S. PATENT DOCUMENTS

| 9,544,709 B2 * | 1/2017 | Jain ........................ H04W 4/70 |
| 2004/0180675 A1 * | 9/2004 | Choi .................. H04W 72/005 |
| | | 455/458 |

(Continued)

FOREIGN PATENT DOCUMENTS

| KR | 1020150016612 | 2/2015 |
| WO | 2011112051 | 9/2011 |

(Continued)

OTHER PUBLICATIONS

PCT International Application No. PCT/KR2017/000739, Written Opinion of the International Searching Authority dated May 12, 2017, 25 pages.

(Continued)

*Primary Examiner* — Brian P Cox
(74) *Attorney, Agent, or Firm* — Lee, Hong, Degerman, Kang & Waimey

(57) ABSTRACT

A network node of the present invention transmits downlink data for user equipment using a paging message. The user equipment can transmit to the network node a radio resource control (RRC) connection request message including acknowledgement information that indicates acknowledgement of the downlink data if the paging message contains the downlink data for the user equipment. The network node can transmit to the user equipment an RRC connection refusal message including information that indicates confirmation with respect to the acknowledgement information if the paging message contains the downlink data for the user (Continued)

equipment and the RRC connection request message contains the acknowledgement information.

15 Claims, 12 Drawing Sheets

(51) Int. Cl.
*H04W 68/02* (2009.01)
*H04W 76/20* (2018.01)
*H04W 4/70* (2018.01)
*H04W 68/00* (2009.01)
*H04W 36/00* (2009.01)
*H04W 76/18* (2018.01)
*H04W 80/02* (2009.01)

(52) U.S. Cl.
CPC ........... *H04W 68/00* (2013.01); *H04W 76/10* (2018.02); *H04W 76/20* (2018.02); *H04W 76/27* (2018.02); *H04W 76/18* (2018.02); *H04W 80/02* (2013.01)

(56) References Cited

U.S. PATENT DOCUMENTS

| | | | |
|---|---|---|---|
| 2012/0254890 A1* | 10/2012 | Li | H04W 4/70 |
| | | | 719/313 |
| 2013/0017829 A1* | 1/2013 | Kim | H04W 60/06 |
| | | | 455/435.1 |
| 2013/0100895 A1* | 4/2013 | Aghili | H04W 4/00 |
| | | | 370/329 |

FOREIGN PATENT DOCUMENTS

| | | | | |
|---|---|---|---|---|
| WO | 2011119680 | 9/2011 | | |
| WO | WO-2013016862 A1 * | 2/2013 | ............. | H04W 4/70 |
| WO | 2013107391 | 7/2013 | | |
| WO | 2014000650 | 1/2014 | | |
| WO | 2014054890 | 4/2014 | | |

OTHER PUBLICATIONS

European Patent Office Application Serial No. 17741708.6, Search Report dated Sep. 11, 2019, 8 pages.

* cited by examiner

FIG. 5
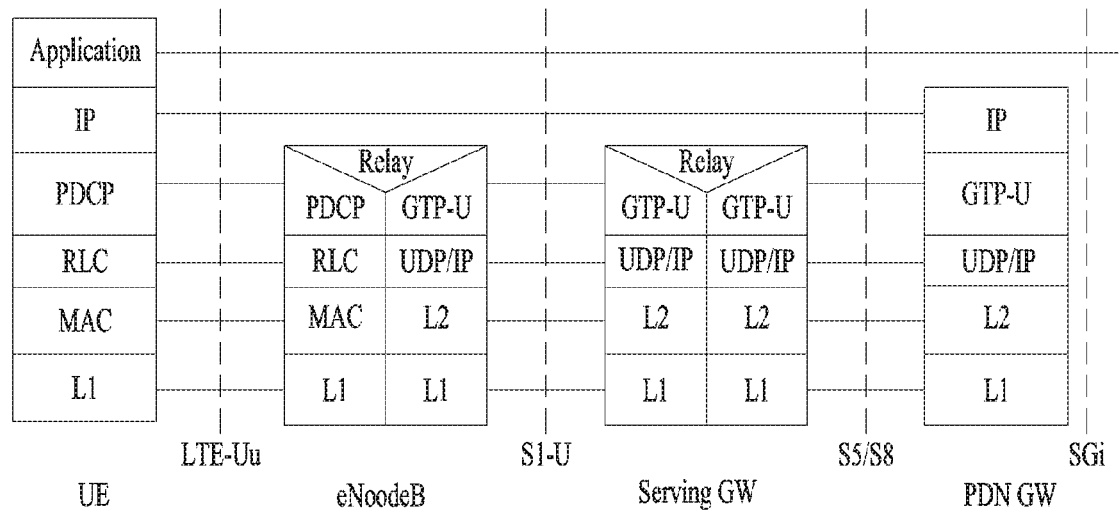
(a) UE-P-GW user plane with E-UTRAN
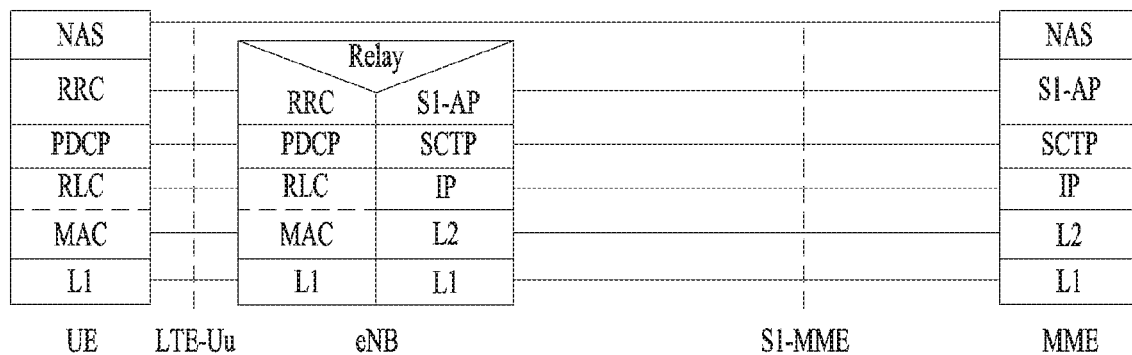
(b) Control Plane UE-MME

METHOD AND USER EQUIPMENT FOR RECEIVING DATA, AND METHOD AND BASE STATION FOR TRANSMITTING DATA

CROSS-REFERENCE TO RELATED APPLICATIONS

This application is the National Stage filing under 35 U.S.C. 371 of International Application No. PCT/KR2017/000739, filed on Jan. 20, 2017, which claims the benefit of U.S. Provisional Application No. 62/281,198, filed on Jan. 21, 2016, the contents of which are all hereby incorporated by reference herein in their entirety.

TECHNICAL FIELD

The present invention relates to a wireless communication system and, more particularly, to a method and apparatus for transmitting/receiving data.

BACKGROUND ART

A wireless communication system has been widely deployed to provide a diverse range of communication services such as a voice communication service and a data communication service. Generally, the wireless communication system is a sort of multiple access system capable of supporting communication with multiple users by sharing available system resources (e.g., bandwidth, transmit power, etc.). For example, the multiple access system may include one of a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, and the like.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving data by a user equipment in a wireless communication system. The method may include receiving a paging message; if the paging message includes downlink data for the user equipment, transmitting a radio resource control (RRC) connection request message including acknowledgement information indicating an acknowledgement of the downlink data; and receiving an RRC connection reject message including information indicating that the acknowledgement information is confirmed.

In another aspect of the present invention, provided herein is a user equipment for receiving data in a wireless communication system. The user equipment may include a transceiver, and a processor configured to control the transceiver. The processor may be configured to: control the transceiver to receive a paging message; if the paging message includes downlink data for the user equipment, control the transceiver to transmit a radio resource control (RRC) connection request message including acknowledgement information indicating an acknowledgement of the downlink data; and control the transceiver to receive an RRC connection reject message including information indicating that the acknowledgement information is confirmed.

In another aspect of the present invention, provided herein is a method of transmitting data by a base station in a wireless communication system. The method may include transmitting a paging message for a user equipment; and receiving a radio resource control (RRC) connection request message from the user equipment. If the paging message includes downlink data for the user equipment and the RRC connection request message includes acknowledgement information indicating an acknowledgement of the downlink data, an RRC connection reject message including information indicating that the acknowledgement information is confirmed may be transmitted to the user equipment.

In another aspect of the present invention, provided herein is a base station for transmitting data in a wireless communication system. The base station may include a transceiver, and a processor configured to control the transceiver. The processor may be configured to: control the transceiver to transmit a paging message for a user equipment; and control the transceiver to receive a radio resource control (RRC) connection request message from the user equipment. If the paging message includes downlink data for the user equipment and the RRC connection request message includes acknowledgement information indicating an acknowledgement of the downlink data, the processor may be configured to control the transceiver to transmit an RRC connection reject message including information indicating that the acknowledgement information is confirmed to the user equipment.

In each aspect of the present invention, the downlink data may be transmitted or received in a non-access stratum (NAS) message in the paging message.

In each aspect of the present invention, an RRC layer of the user equipment may deliver paging information in the paging message and the downlink data to a non-access stratum (NAS) layer of the user equipment.

In each aspect of the present invention, upon receiving the RRC connection reject message, the user equipment may terminate an RRC connection establishment procedure started by transmission of the RRC connection request message.

In each aspect of the present invention, the downlink data may be transmitted or received through the paging message when the user equipment is in a discontinuous reception mode or a power saving mode.

In each aspect of the present invention, the paging message may further include information indicating that the downlink data is included in the paging message.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to an embodiment of the present invention, it is possible to implement a low-complexity/low-cost UE.

According to an embodiment of the present invention, a UE can communicate with the network in narrowband.

According to an embodiment of the present invention, a small amount of data can be efficiently transmitted/received.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating LTE (Long Term Evolution) protocol stacks for a user plane and a control plane.

MODE FOR CARRYING OUT THE INVENTION

Figure 1:
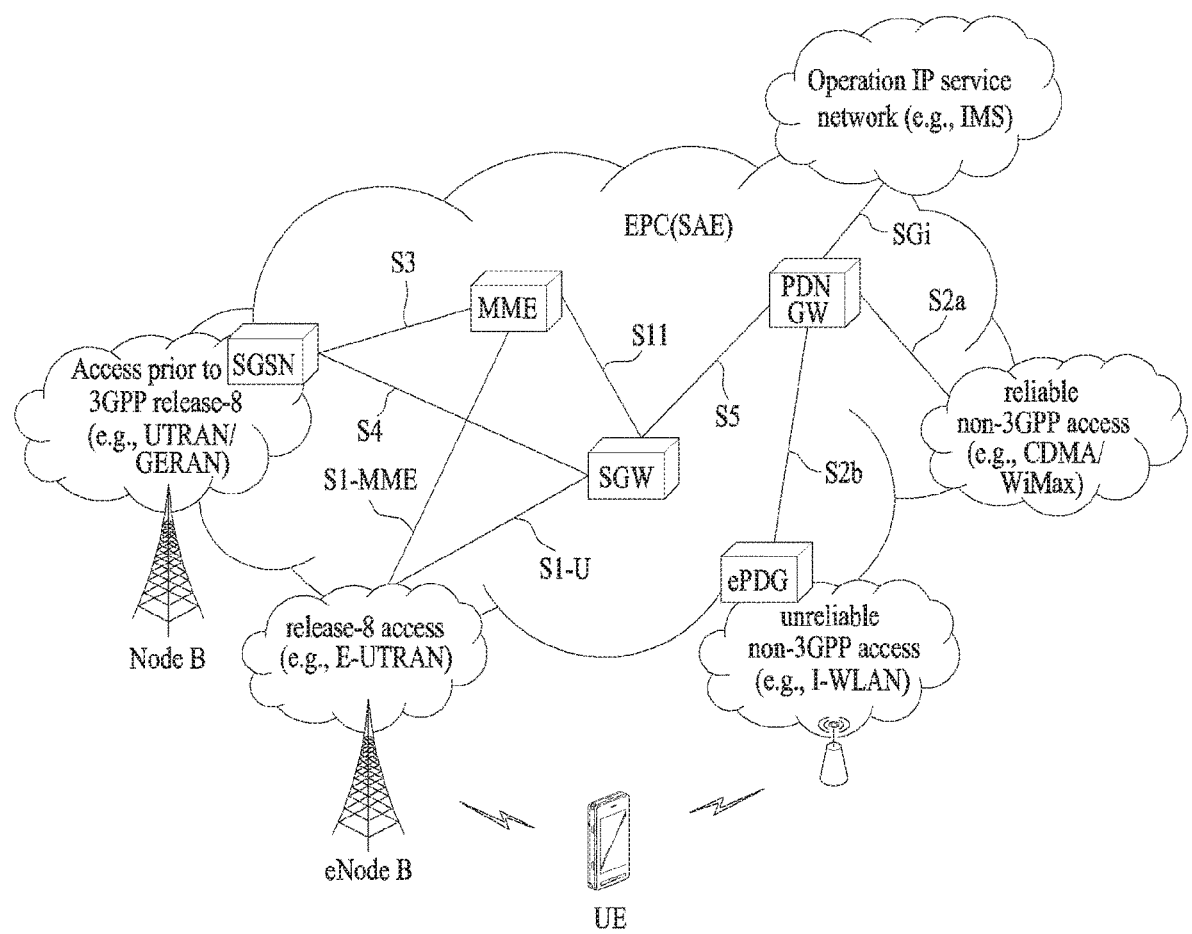
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.
- IMS (IP Multimedia Subsystem or IP Multimedia Core Network Subsystem): An architectural framework for providing standardization for delivery of voice or other multimedia services over Internet protocol (IP).
- UMTS (Universal Mobile Telecommunications System): Global System for Mobile Communication (GSM)-based 3rd generation mobile communication technology developed by 3GPP.
- EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.
- NodeB: A base station of GERAN/UTRAN which is installed outdoors and has coverage of a macro cell scale.
- eNodeB/eNB: A base station of E-UTRAN which is installed outdoors and has coverage of a macro cell scale.
- UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.
- HNB (Home NodeB): A base station of a UMTS network. The HNB is installed indoors and has coverage of a micro cell scale.
- HeNB (Home eNodeB): A base station of an EPS network. The HeNB is installed indoors and has coverage of a micro cell scale.
- MME (Mobility Management Entity): A network node of the EPS network performing functions of Mobility Management (MM) and Session Management (SM).
- PDN-GW (Packet Data Network-Gateway)/PGW/P-GW: A network node of the EPS network performing functions of UE IP address allocation, packet screening and filtering, and charging data collection.
- SGW (Serving Gateway)/S-GW: A network node of the EPS network performing functions of mobility anchor, packet routing, idle mode packet buffering, and triggering of the MME paging the UE.
- PCRF (Policy and Charging Rule Function): A network node of the EPS network making a policy decision for dynamically applying a differentiated QoS and charging policy on a service flow basis.
- OMA DM (Open Mobile Alliance Device Management): A protocol designed for management of mobile devices such as a cellular phone, a PDA, and a portable computer, that performs functions of device configuration, firmware upgrade, and error report.
- OAM (Operation Administration and Maintenance): A group of network management functions that provides network defect indication, performance information, and data and diagnosis functions.
- NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.
- EMM (EPS Mobility Management): A sub-layer of a NAS layer, that may be in either an "EMM-Registered" or "EMM-Deregistered" state depending on whether a UE is attached to or detached from a network.
- ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.
- AS (Access-Stratum): This includes a protocol stack between the UE and a wireless (or access) network and is in charge of data and network control signal transmission.
- NAS configuration MO (Management Object): An MO used in the process of configuring parameters related to NAS functionality for the UE.
- PDN (Packet Data Network): A network where a server (e.g., an MMS (Multimedia Messaging Service) server, a WAP (Wireless Application Protocol) server, etc.) supporting a specific service is located.
- PDN connection: A logical connection between a PDN and a UE represented by one IP address (one IPv4 address and/or one IPv6 prefix).
- APN (Access Point Name): A text sequence for indicating or identifying a PDN. A requested service or network is accessed through a specific P-GW. The APN means a predefined name (text sequence) in a network so as to discover this P-GW. (e.g., internet. mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
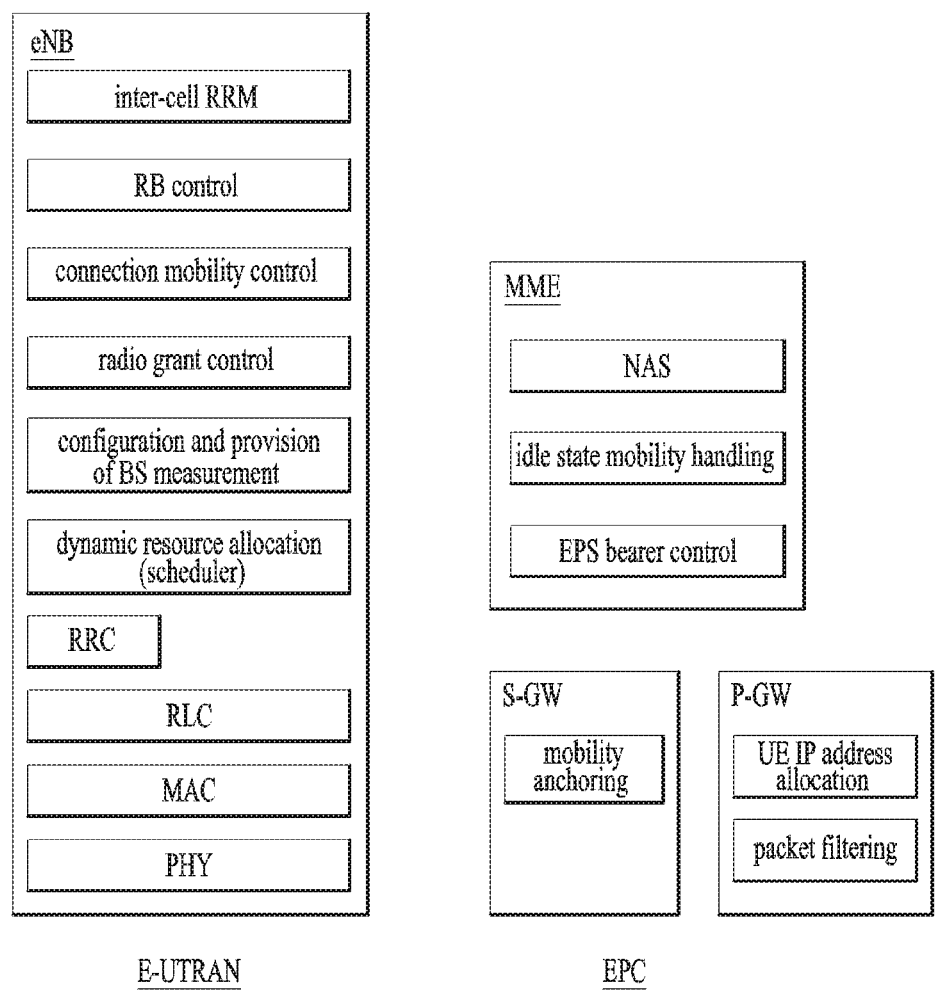
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
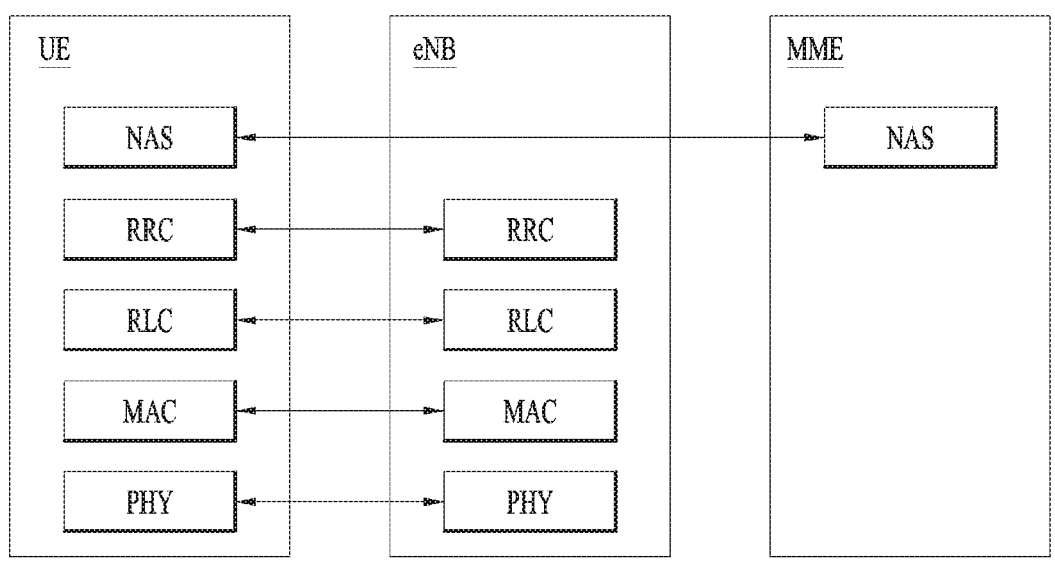
FIG. 3 is a diagram exemplarily illustrating the structure of a radio interface protocol in a control plane.
Figure 4:
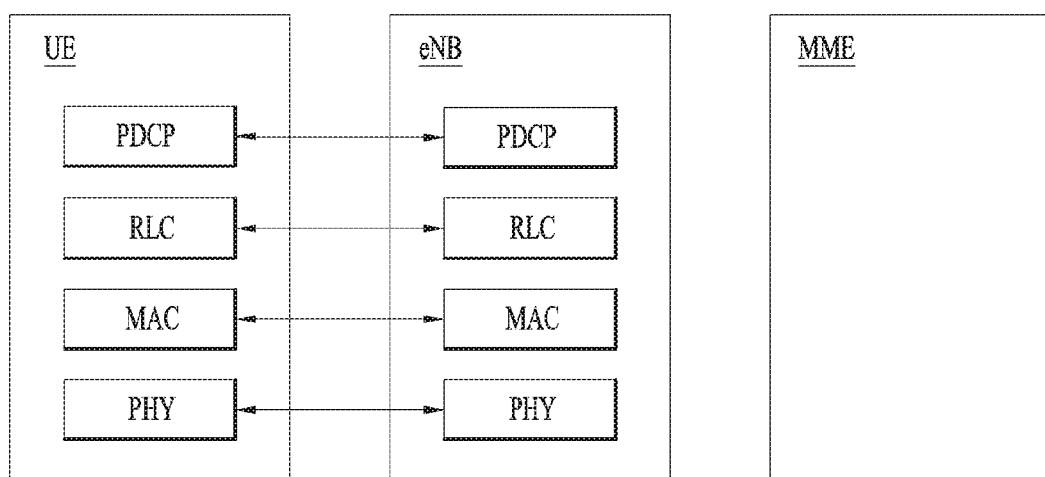
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
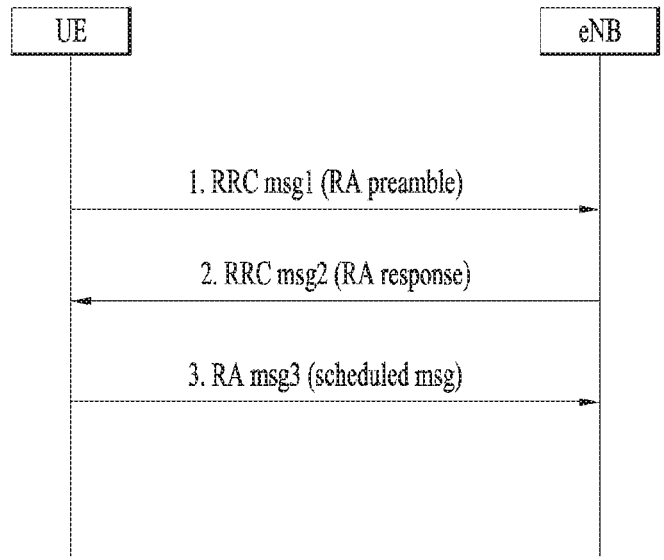
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
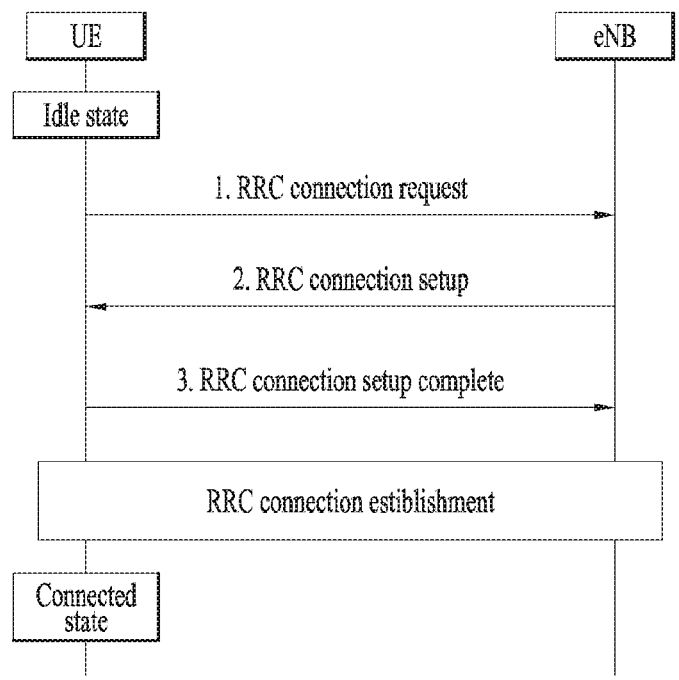
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Figure 8:
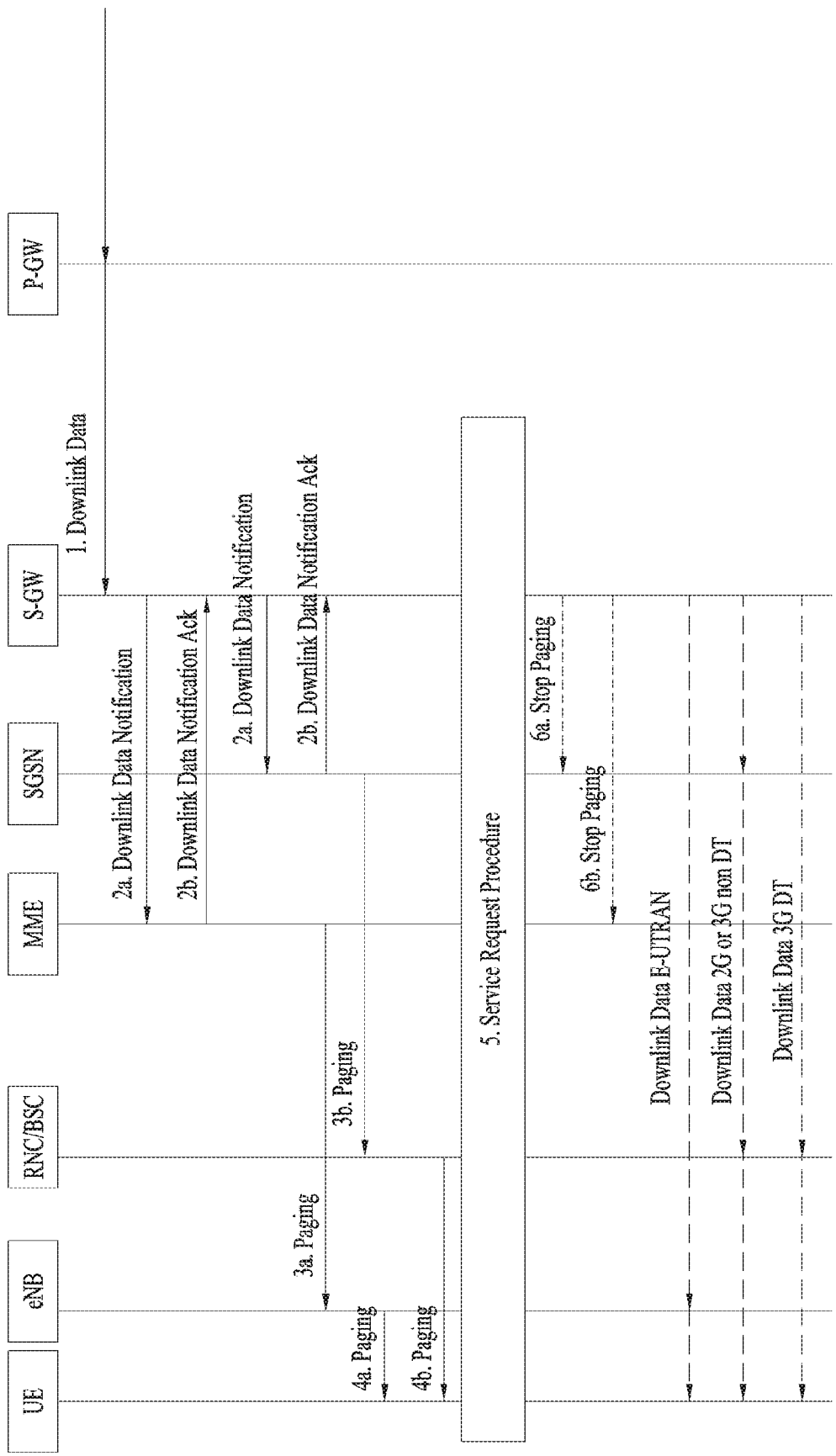
FIG. 8 is a diagram illustrating a network triggered service request procedure.

FIG. 8 is a diagram illustrating a network triggered service request procedure.

For a detailed network triggered service request procedure according to FIG. 8, reference is made to Section 5.3.4.3 of the document 3GPP TS 23.401. The network triggered service request procedure will now be described in brief. If an MME has or needs to transmit downlink data or signals to an UE in the ECM-IDLE state, for example, if the MME needs to perform the MME/HSS-initiated detach procedure for the ECM-IDLE mode UE or an S-GW receives control signaling (e.g. Create Bearer Request or Modify Bearer Request), the MME starts the network triggered service request procedure. When the S-GW receives Create Bearer Request or Modify Bearer Request for a UE in the state that idle mode signaling reduction (ISR) is activated, the S-GW does not have a downlink S1-U, and an SGSN has notified the S-GW that the UE has moved to an PMM-IDLE or STANDBY state, the S-GW buffers signaling messages and transmits Downlink Data Notification to trigger the MME and SGSN to page the UE. If the S-GW is triggered to send second Downlink Data Notification for a bearer with higher priority (i.e. ARP priority level) than that for which the first Downlink Data Notification was sent while waiting for the user plane to be established, the S-GW sends a new Downlink Data Notification message indicating the higher priority to the MME. If the S-GW receives additional downlink data packets for a bearer with same or higher priority than that for which the first Downlink Data Notification was sent, or if after sensing a second Downlink Data Notification message indicating the higher priority, the S-GW receives additional downlink data packets for the UE, the S-GW buffers these downlink data packets and does not send new Downlink Data Notification. The S-GW will be notified about the current RAT type based on a UE triggered service request procedure. In addition, the S-GW will keep executing a dedicated bearer activation or dedicated bearer modification procedure. That is, the S-GW will send corresponding buffered signaling to the MME or SGSN where UE resides in now and inform a P-GW of the current RAT type if the RAT type has been changed compared to the last reported RAT Type. If dynamic PCC is deployed, the current RAT type information can be conveyed from the P-GW to a PCRF. If PCRF response leads to EPS bearer modification, the P-GW initiates a bearer update procedure. When sending the Downlink Data Notification, the S-GW includes both an EPS bearer ID and ARP. If the Downlink Data Notification is triggered by the arrival of downlink data packets at the S-GW, the S-GW includes an EPS bearer ID and ARP associated with the bearer through which the downlink data packet was received. If the Downlink Data Notification is triggered by the arrival of control signaling and if the control signaling includes an EPS bearer ID and ARP, the S-GW includes the corresponding EPS bearer ID and APR. If the ARP is not present in the control signaling, the S-GW includes an ARP in a stored EPS bearer context. When a local gateway (L-GW) receives downlink data for a UE in the ECM-IDLE state, if a LIPA PDN connection exists, the L-GW sends the first downlink user packet to the S-GW and buffers all other downlink user packets.

Figure 9:
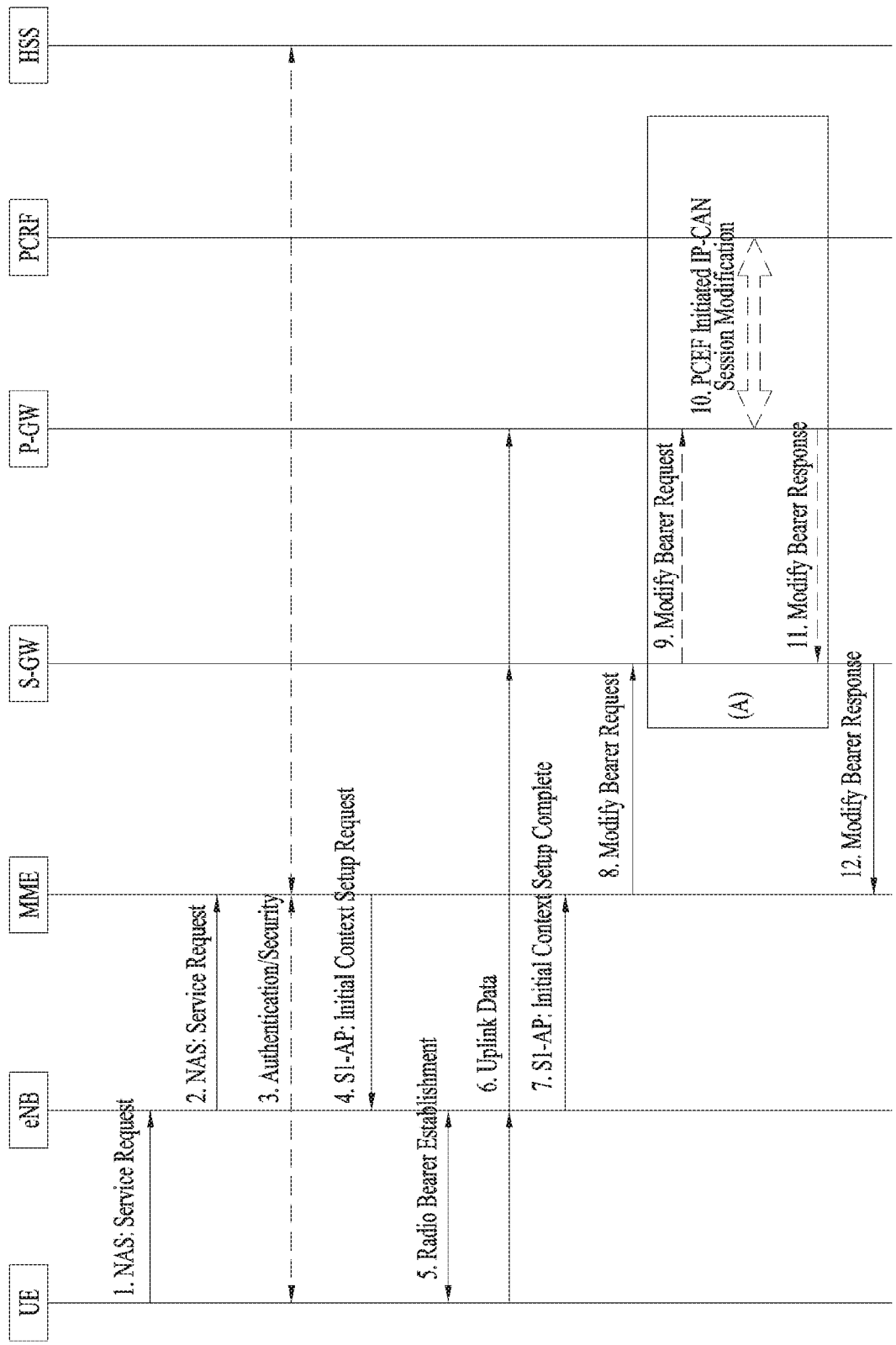
FIG. 9 illustrates a UE triggered Service Request procedure.

In step 5 of the procedure of FIG. 8, if the UE in an ECM-IDLE state receives a paging message, the UE performs a UE triggered service request procedure (refer to FIG. 9). If the MME has already a signaling connection on an S1-MME toward the UE, messages of the UE triggered service request procedure starts to be transmitted or received from the step in which the MME establishes the bearer(s).

FIG. 9 illustrates a UE triggered service request procedure.

If traffic to be transmitted occurs, the UE transmits an RRC connection request to the eNB through a random access procedure including steps 1) to 3) of FIG. 7. When the eNB accepts the RRC connection request from the UE, the eNB sends an RRC Connection Setup message to the UE. Upon receiving the RRC Connection Setup message, the UE sends an RRC Connection Setup Complete message to the eNB by including a service request in the message. A service request procedure performed between the UE and the network node(s) will now be described with reference to FIG. 9.

1. The UE sends NAS message Service Request towards the MME encapsulated in an RRC message (e.g. RRC Connection Setup Complete message of FIG. 7) to the eNB.
2. The eNB forwards NAS message to MME. NAS message is encapsulated in an S1-AP.
3. NAS authentication/security procedures may be performed.
4. The MME sends an S1-AP Initial Context Setup Request message to the eNB. In this step, radio and S1 bearers are activated for all activate EPS bearers. The eNB stores a security context, MME signaling connection ID, EPS bearer QoS(s), etc. in a UE context.
5. The eNB performs the radio bearer establishment procedure. The user plane security is established at this step. When the user plane radio bearers are setup the Service Request is completed and EPS bearer state is synchronized between the UE and the network, i.e. the UE should remove the EPS bearer for which no radio bearers are setup.
6. The uplink data from the UE can now be forwarded by eNB to the S-GW. The eNB sends the uplink data to the S-GW address and TEID provided in the step 4. The S-GW forwards the uplink data to the P-GW.
7. The eNB sends S1-AP message Initial Context Setup Request to the MME.
8. The MME sends a Modify Bearer Request message for each PDN connection to an S-GW. The S-GW is now able to transmit downlink data towards the UE.
9. If the RAT Type has changed compared to the last reported RAT Type or if the UE's Location Info IE is present in step 8, the S-GW sends the Modify Bearer Request message (RAT Type) per PDN connection to the P-GW. User Location Information IE is also included if it is present in step 8.
10. If dynamic PCC is deployed, the P-GW interacts with the PCRF to get the PCC rule(s) according to the RAT Type by means of a PCEF initiated IP-CAN Session Modification procedure as defined in 3GPP TS 23.203.
11. The P-GW sends the Modify Bearer Response to the S-GW.
12. The S-GW sends a Modify Bearer Response to the MME.

For details of the UE triggered service request procedure according to FIG. 9, reference is made to Section 5.3.4.1 of the document 3GPP TS 23.401.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support 'IoT' devices characterized as ultra-low complexity, power limitation and low data rates.

In the prior art, a connection with the network should be established for transmitting data to a UE in an EMM-Idle mode. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

In the case of a Control Plane CIoT EPS optimization solution, there is no setup data radio bearer, but data packets are transmitted through signaling radio bearers. Thus, this solution is most suitable for transmission of infrequent small data packets. When a UE and MME use the Control Plane CIoT EPS optimization, the UE and MME may transfer IP or non-IP data through NAS signaling depending on data types selected for a PDN connection supported at PDN connection establishment. The Control Plane CIoT EPS optimization can be achieved by using NAS transport capabilities of RRC and S1-AP protocols and data transfer through GTP (Evolved General Packet Radio Service (GPRS) Tunneling Protocol) tunnels between an MME and an S-GW and between an S-GW and a P-GW.

Figure 10:
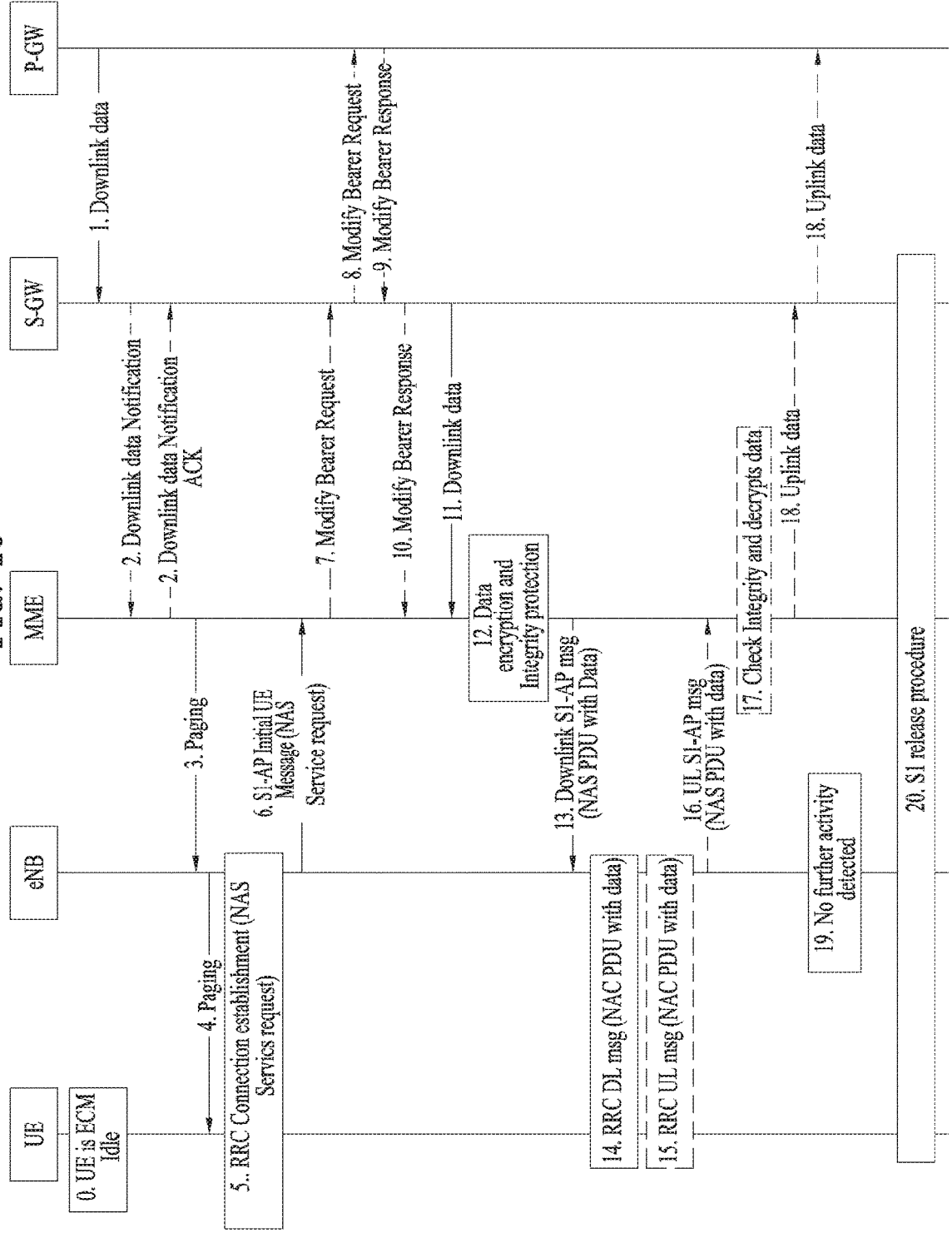
FIG. 10 illustrates a mobile terminated data transport procedure according to Control Plane CIoT EPS optimization.

FIG. 10 illustrates a mobile terminated data transport procedure according to Control Plane CIoT EPS optimization.

0. The UE is EPS attached and in ECM-Idle mode.
1. When the S-GW receives a downlink data packet/control signalling for a UE known as not user plane connected (i.e. the S GW context data indicates no downlink user plane TEID towards the MME), it buffers the downlink data packet and identifies which MME is serving that UE.
2. The S-GW sends a Downlink Data Notification message (Allocation and Retention Priority (ARP), EPS Bearer ID) to the MME for which it has control plane connectivity for the given UE. The ARP and EPS Bearer ID are always set in Downlink Data Notification. The MME responds to the S GW with a Downlink Data Notification Ack message.

An MME detects that the UE is in a power saving state (e.g. Power Saving Mode) and cannot be reached by paging at the moment, shall invoke extended buffering depending on operator configuration, except for cases described in next paragraphs. MME derives the expected time before radio bearers can be established to the UE. The MME then indicates DL Buffering Requested to the S-GW in the Downlink Data Notification Ack message and includes a DL Buffering Duration time and optionally a DL Buffering Suggested Packet Count. The MME stores a new value for the DL Data Buffer Expiration Time in the mobility management (MM) context for the UE based on the DL Buffering Duration time and skips the remaining steps of this procedure. The DL Data Buffer Expiration Time is used for UEs using power saving state and indicates that there are buffered data in the S-GW and that the user plane setup procedure is needed when the UE makes signalling with the network. When the DL Data Buffer Expiration Time has expired, the MME considers no DL data to be buffered and no indications of Buffered DL Data Waiting are sent during context transfers at tracking area update (TAU) procedures.

If there is an "Availability after DDN Failure" monitoring event configured for the UE in the MME, the MME/SGSN does not invoke extended buffering. Instead, the MME sets the Notify-on-available-after-DDN-failure flag to remember to send an "Availability after DDN Failure" notification when the UE becomes available. If there is a "UE Reachability" monitoring event configured for the UE in the MME, the MME/SGSN does not invoke extended buffering.

NOTE: When "Availability after DDN failure" and "UE reachability" monitoring events are used for a UE, the application server is assumed to send data when the UE is reachable, hence no extended buffering is needed. If there are multiple application servers, the event notifications and extended buffering may be needed simultaneously. It is assumed this is handled through additional information based on SLA as described in the next paragraph.

The MME may use additional information based on a SLA with the MTC user for when to invoke extended buffering, e.g. only invoke it for a certain APN, do not invoke it for certain subscribers, invoke extended buffering in conjunction with "Availability after DDN failure" and "UE reachability" monitoring events, etc.

A S-GW that receives a DL Buffering Requested indication in a Downlink Data Notification Ack message stores a new value for the DL Data Buffer Expiration Time based on the DL Buffering Duration time and does not send any additional Downlink Data Notification if subsequent downlink data packets are received in the S-GW before the buffer time DL Data Buffer Expiration Time has expired for the UE.

If the S-GW, while waiting for the user plane to be established, is triggered to send a second Downlink Data Notification for a bearer with higher priority (i.e. ARP priority level) than the first Downlink Data Notification was sent for, the S-GW sends a new Downlink Data Notification message indicating the higher priority to the MME. If the S-GW receives additional downlink data packets for a bearer with same or lower priority than the first Downlink Data Notification was sent for or if the S-GW has sent the second Downlink Data Notification message indicating the higher priority and receives additional downlink data packets for this UE, the S-GW buffers these downlink data packets and does not send a new Downlink Data Notification.

If the S-GW, while waiting for the user plane to be established, receives a Modify Bearer Request message from MME other than the one it sent a Downlink Data Notification message to, the S-GW re-sends the Downlink Data Notification message only to the new MME from which it received the Modify Bearer Request message.

Upon reception of a Downlink Data Notification Ack message with an indication that the Downlink Data Notification message has been temporarily rejected and if the Downlink Data Notification is triggered by the arrival of downlink data packets at the S-GW, the S-GW may start a locally configured guard timer and buffers all downlink user packets received to the given UE and waits for a Modify Bearer Request message to come. Upon reception of a Modify Bearer Request message, the S-GW re-sends the Downlink Data Notification message only to the new MME from which it received the Modify Bearer Request message. Otherwise the S-GW releases buffered downlink user packets at expiry of the guard timer or receiving the Delete Session Request message from MME.

3. If the UE is registered in the MME and considered reachable, the MME sends a Paging message (NAS ID for paging, TAI(s), UE identity based DRX index, Paging DRX length, list of CSG IDs for paging, Paging Priority indication) to each eNB belonging to the tracking area(s) in which the UE is registered.

Paging priority indication is included only if the MME receives a Downlink Data Notification with an ARP priority level associated with priority services, as configured by the operator.

One Paging Priority level can be used for multiple ARP priority level values. The mapping of ARP priority level values to Paging Priority level (or levels) is configured by operator policy.

During a congestion situation the eNB may prioritise the paging of UEs according to the Paging Priority indications.

If the MME, while waiting for a UE response to the Paging Request message sent without Paging Priority indication, receives a Downlink Data Notification which indicates an ARP priority level associated with priority services, as configured by the operator, the MME shall send another paging message with the suitable Paging Priority.

Paging strategies may be configured in the MME. Paging strategies may include:
   paging retransmission scheme (e.g. how frequently the paging is repeated or with what time interval);
   determining whether to send the Paging message to the eNB(s) during certain MME high load conditions;
   whether to apply sub-area based paging (e.g. first page in the last known ECGI or tracking area (TA) and retransmission in all registered TAs.

NOTE: The Paging priority in the Paging message is set based on priority level of the ARP IE received in Downlink Data Notification or Create/Update Bearer Request message and is independent from any paging strategy.

The MME and the NB-IOT RAN may support further paging optimisations in order to reduce the signalling load and the network resources used to successfully page a UE by one or several following means:
   by the MME implementating specific paging strategies (e.g. the S1 Paging message is sent to the eNB that served the UE last);
   by the MME considering Information On Recommended Cells and eNBs provided by the NB-IOT RAN at transition to ECM IDLE. The MME takes the eNB related part of this information into account to determine the eNBs to be paged, and provides the information on recommended cells within the S1 Paging message to each of these eNBs;
   by the NB-IOT RAN considering the Paging Attempt Count Information provided by the MME at paging.

When implementing such optimisations/strategies, the MME shall take into account any PSM active timer and the DRX interval for the UE.

If the UE Radio Capability for Paging Information is available in the MME, the MME adds the UE Radio Capability for Paging Information in the S1 Paging message to the eNB.

If the Information On Recommended Cells and eNBs For Paging is available in the MME, the MME shall take that information into account to determine the eNBs for paging and, when paging an eNB, the MME may transparently convey the information on recommended cells to the eNB.

The MME may include in the S1AP Paging message(s) the paging attempt count information. The paging attempt count information shall be the same for all eNBs selected by the MME for paging.

4. If eNBs receive paging messages from the MME, the UE is paged by the eNBs.

5~6. As the UE is in the ECM-IDLE state, upon reception of paging indication, the UE sends a UE triggered Service Request NAS message over RRC Connection request and S1-AP initial message. The MME supervises the paging procedure with a timer. If the MME receives no response from the UE to the Paging Request message, it may repeat the paging according to any applicable paging strategy described in step 3.

If the MME receives no response from the UE after this paging repetition procedure, it shall use the Downlink Data Notification Reject message to notify the S-GW about the paging failure, unless the MME is aware of an ongoing MM procedure that prevents the UE from responding, i.e. the MME received a Context Request message indicating that the UE performs TAU with another MME. When a Downlink Data Notification Reject message is received, the S-GW deletes the buffered packet(s). The S-GW may invoke the procedure P-GW Pause of Charging if UE is in ECM IDLE and the P-GW has enabled "PDN charging pause" feature.

NOTE: The S-GW may initiate the procedure P-GW Pause of Charging at any time before step 5 if the UE is in ECM IDLE and the P-GW has indicated that the feature is enabled for this PDN.

7. The MME sends a Modify Bearer Request message (MME address, MME TEID DL, Delay Downlink Packet Notification Request, RAT Type) to the S-GW. The S-GW is now able to transmit downlink data towards the UE. Although the usage of information elements (IEs) of the Delay Downlink Packet Notification Request is described in the UE initiated service request procedure of Section 5.3.4.2 of the document 3GPP TS 23.401, the same principle is applied even to this case. If the P-GW requested UE's location and/or User CSG information and the UE's location and/or User CSG information has changed, the MME also includes the User Location Information IE and/or User CSG Information IE in this message. If the Serving Network IE has changed compared to the last reported Serving Network IE then the MME also includes the Serving Network IE in this message. If the UE Time Zone has changed compared to the last reported UE Time Zone then the MME shall include the UE Time Zone IE in this message.

NOTE: if the RAT currently used is NB-IOT this shall be reported as different from E-UTRA.

8. If the RAT Type has changed compared to the last reported RAT Type or if the UE's Location and/or Info IEs and/or UE Time Zone and Serving Network id are present in step 7, the S-GW shall send the Modify Bearer Request message (RAT Type) to the P-GW. User Location Information IE and/or User CSG Information IE and/or Serving Network IE and/or UE Time Zone are also included if they are present in step 7.

If the Modify Bearer Request message is not sent because of above reasons and the P-GW charging is paused, then the S-GW shall send a Modify Bearer Request message with PDN Charging Pause Stop Indication to inform the P-GW that the charging is no longer paused. Other IEs are not included in this message.

9. The P-GW sends the Modify Bearer Response to the S-GW.
10. The S-GW returns a Modify Bearer Response (S-GW address and TEID for uplink traffic) to the MME as a response to a Modify Bearer Request message.
11. Buffered DL data is sent by the S-GW to the MME.
12~13. The MME encrypts and integrity protects DL data and sends it to the eNB using a NAS message carried by a DL S1-AP message.
14. The NAS PDU with data is delivered to the UE via a DL RRC message.
15. While the inactivity timer is running further UL and DL data can be sent using NAS PDUs. In step 16 an UL data transfer is shown using an UL RRC message encapsulating a NAS PDU with data. At any time the UE may provide a Release Assistance Information with UL data in the NAS Message.
16. The NAS PDU with data is send to the MME in a UL S1-AP message.
17. The data is checked for integrity and decrypted.
18. The MME sends UL data to the P-GW via the S-GW and executes any action related to the presence of Release Assistance Information following the behaviour for mobile originated (MO) data transfer.
19. If no NAS activity exists for a while the eNB detects inactivity and executes step 20.
20. The eNB starts the eNB initiated S1 release according to Section 5.3.5 of the document 3GPP TS 23.401.

Figure 11:
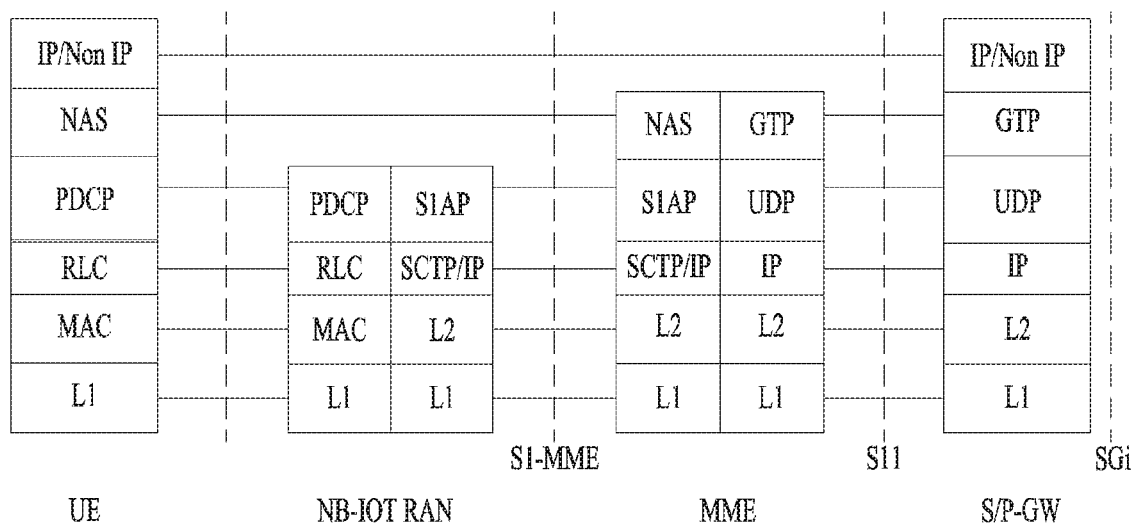
FIG. 11 illustrates user plane protocol stacks between a UE and a P-GW in accordance with the Control Plane CIoT EPS optimization.

FIG. 11 illustrates user plane protocol stacks between a UE and a P-GW in accordance with the Control Plane CIoT EPS optimization.

Referring to FIG. 11, GTP-u tunnels user data between MME and the S-GW as well as between the S-GW and the P-GW in the backbone network. GTP shall encapsulate all end user IP packets. GTP encapsulates all end user IP packets. UDP/IP are the backbone network protocols used for routing user data and control signalling. NAS is the Non Access Stratum Layer used to carry Data from UE to MME and may include Header compression and security functions of user plane IP data.

A CIoT network or technology refers to providing an optimized communication service to an IoT UE mainly in terms of a core network and a narrowband Internet of things (NB-IoT) network or technology refers to optimizing a radio interface of a legacy LTE technology for IoT.

As known by the name of NB-IoT, NB-IoT is radio technology for providing an IoT service using a narrowband frequency of about 200 kHz. As compared with the legacy LTE technology using a frequency band of a minimum of 1.25 MHz, NB-IoT uses a significantly narrow frequency band. Therefore, processing power can be minimized and power consumption can be minimized in terms of the UE.

CIoT is technology for minimizing power consumption of the UE through a scheme (C-plane solution) in which an MME processes data or a scheme (U-plane solution) in which the UE and the eNB maintain a context and use the context for the next connection even when the UE is in a state similar to an RRC_IDLE state, in order to solve waste of power of the UE caused by exchange of numerous messages in a legacy attach procedure or service request procedure (refer to FIG. 9).

Therefore, NB-IoT radio technology and CIoT technology are individually applicable. That is, even when the NB-IoT radio technology is not used, it is possible to apply the CIoT technology through a legacy LTE radio network. This means that the CIoT technology is applicable to a UE incapable of using the NB-IoT radio technology, for example, a UE which has already been released by applying only the LTE radio technology. This also means that a cell based on the legacy LTE radio technology may support a legacy LTE UE such as a smartphone and simultaneously support an IoT UE.

A power saving mode (PSM) or extended discontinuous reception (eDRX) is under consideration. If traffic is queued for a UE, a normal LTE paging cycle during which the UE can be contacted by a network is 1.28 s. eDRX extends a cycle during which the UE may be in an idle state to more than 1.28 s. Accordingly, when there is no need to frequently awake, as in the case of an MTC UE, eDRX may be applied to reduce battery consumption. The PSM is a mode in which the UE informs the network that the UE will enter an indefinitely dormant state. At a predefined time or if data to be transmitted is present, the UE in the PSM wakes up and transmits data to the network, and remains in an idle state during a predetermined time so that the UE is reachable if needed. Since the UE is dormant during the entire PSM window, power consumption of the UE is extremely low.

In a legacy system prior to introduction of the PSM or eDRX, if an S1-U is in an idle state, the S-GW transmits a downlink data notification (DDN) message to an MME while buffering a downlink packet and the MME that has received the DDN message transmits a paging message to eNB(s). The UE that has received the paging message starts to perform a service request procedure. As the PSM or eDRX, which is a state in which the UE cannot be reachable even though the UE is in an idle state, i.e., a state in which the UE cannot respond even though the network transmits the paging message, is introduced, a situation may occur in which an S-GW has received downlink data but transmission of the DDN message is invalid. Therefore, in some cases, the S-GW needs to perform buffering for a longer period than in the legacy system.

Accordingly, a more efficient method capable of transmitting downlink data to the UE which is using the PSM or eDRX mode is demanded.

The present invention relates to a method of effectively delivering data transmitted to the UE from a server or the Internet. According to the present invention described hereinbelow, for delivery of data arriving at a network on downlink for the UE to the UE, connection between the network and the UE may be rapidly configured through minimum signaling between the UE and the network and the downlink data may be rapidly delivered to the UE through connection between the UE and the network. According to the present invention, the downlink data is delivered through a paging message to the UE which is using the eDRX mode or PSM for optimizing power consumption so that the downlink data can be rapidly delivered to the UE.

Proposals of the present invention may be applied to the UE which is using optimization of power consumption or requires optimization of power consumption. For example, the present invention may be used in a communication system supporting data transmission/reception of an IoT UE which uses CIoT and/or NB-IoT.

As illustrated in FIGS. 8 to 10, even when one data packet is delivered, a conventional terminating call is delivered through a process of transmitting a paging signal to the UE, a process of performing an RRC connection by the UE, a process of performing a NAS service request by the UE, a process of generating a security context by the UE and the network, and then a process of finally delivering the data packet to the UE. That is, when one packet is transmitted, numerous signaling processes are needed and thus power is wasted and a transmission time increases.

Therefore, the present invention proposes a method of rapidly delivering data to the UE with minimum latency through minimum signaling when a data packet of a terminating call occurs.

Figure 12:
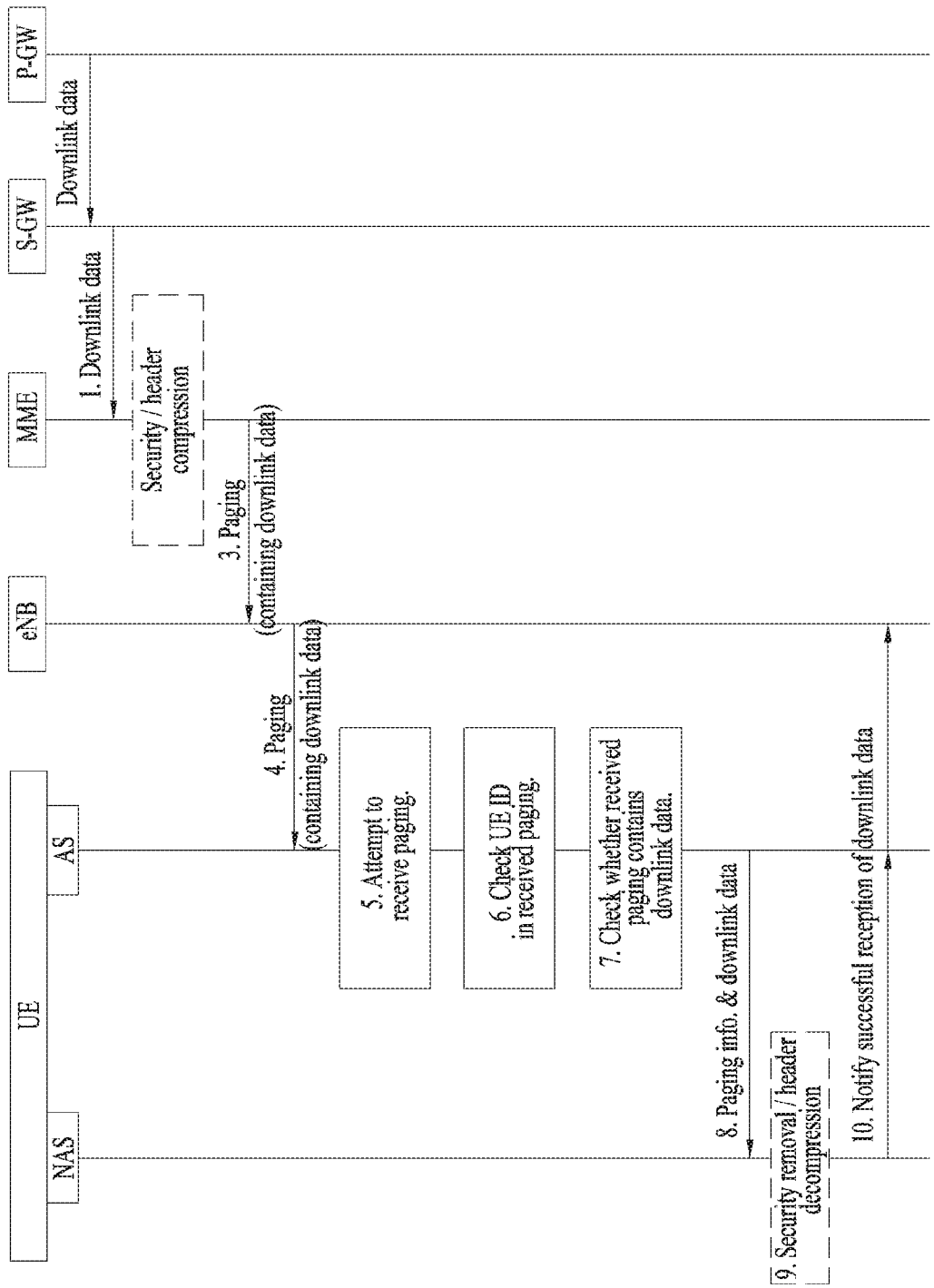
FIG. 12 illustrates a downlink data delivery process according to the present invention.

FIG. 12 illustrates a downlink data delivery process according to the present invention.

Referring to FIG. 12, a data packet of a terminating call, i.e., downlink data, may be delivered using the following steps according to the present invention.

Step 1: Upon receiving data for any UE from a P-GW, an S-GW sends the data according to preset information. The preset information represents information such as an IP address of a node and a port number (e.g., TEID) to which the data is to be sent. In CIoT, the preset information may represent information about an IP address of an MME and information related to a port for the UE.

Step 2: The MME applies security (e.g., ciphering and/or integrity protection) to the data packet received from the S-GW according to a UE to which the data packet is to be transmitted and, if necessary, applies a header compression protocol to the data packet.

Step 3: The MME sends the data packet to which the security and/or header compression protocol is applied to an eNB. The MME may include the data packet in a paging message using S1 signaling and send the paging message to the eNB.

The MME may include the data packet to which the security and/or header compression protocol is applied in a general NAS message and transmit the NAS message. For example, the MME may use a NAS message configured to transmit the data packet, for example, a downlink general NAS transport message or a NAS message having a purpose equivalent to the downlink general NAS transport message, for delivery of the data packet for the UE.

Upon sending the paging message to the eNB, the MME may inform the eNB of whether the paging message additionally includes the data packet which should be delivered to a paged UE.

When the paging message that the MME sends to the eNB additionally includes the data packet which is to be delivered to the paged UE, the MME may transmit information about whether (the ciphering and/or integrity protection or) the header compression protocol has been applied to the data packet, upon sending the paging message.

In Step 3, when the paging message that the MME sends to the eNB additionally includes the data packet which is to be delivered to the paged UE, the MME may send, to the eNB, information as to whether the eNB is allowed to transmit the packet data when the paging message is sent to the UE in each cell for the data packet.

When the paging message that the MME transmits to the eNB additionally includes the data packet which is to be delivered to the paged UE, the MME may transmit, to the eNB, information as to whether the eNB should send the data packet after additionally applying the security or header compression protocol when the eNB sends the data packet to the paged UE.

When the paging message that the MME transmits to the eNB additionally includes the data packet which is to be delivered to the paged UE, the MME may transmit, to the eNB, information as to whether the eNB should send the data packet using a signaling radio bearer (SRB) when the eNB sends the data packet to the paged UE. That is, the MME may transmit, to the eNB, information as to whether or not the eNB should send the data packet through an RRC message or a NAS message.

Step 4: The eNB sends the paging message to UE(s) in each cell, based on the paging message received from the MME.

If the MME informs the eNB that the data packet which should be delivered to the paged UE is present, the eNB may include the data packet in a paging message that the eNB transmits to the UE and include, in the paging message, information indicating that the data packet for the UE is present.

If the MME informs the eNB that the MME has applied the security (ciphering and/or integrity protection) or header compression protocol to the data packet that should be delivered to the paged UE, the eNB may include the data packet in the paging message that the eNB transmits to the UE and include, in the paging message, the information indicating that the data packet for the UE is present.

If the data packet that should be delivered to the UE is included in the paging message received by the eNB from the MME and the MME informs the eNB that eNB should send the data packet when the paging message is transmitted to the UE in each cell, the eNB may include the data packet in the paging message that the eNB transmits to the UE and include, in the paging message, the information indicating that the data packet for the UE is present.

If the data packet that should be delivered to the UE is included in the paging message received by the eNB from the MME and the MME informs the eNB that the data packet may be transmitted without additionally applying the security or header compression protocol, the eNB may include the data packet in the paging message that the eNB transmits to the UE and include, in the paging message, the information indicating that the data packet for the UE is present.

If the data packet that should be delivered to the UE is included in the paging message received by the eNB from the MME and the MME informs the eNB that the SRB should be used when the eNB transmits the data packet to the paged UE, the eNB may include the data packet in the paging message that the eNB transmits to the UE and include, in the paging message, the information indicating that the data packet for the UE is present.

In Step 4, the data packet may be included in an RRC message (e.g., downlink NAS transport message) used to transmit a NAS message in an RRC layer and then may be transmitted. Alternatively, the structure of an RRC paging message may be changed so that a container, which is used to transmit the NAS message, such as a NAS container may be included in the RRC paging message and a field indicating whether the container is included may be additionally included in the RRC paging message.

Step 5: Each UE attempts to receive the paging message at a place where the UE stays at a paging period thereof.

Step 6: Upon receiving the paging message, a corresponding UE checks whether an ID identical to an ID thereof is included in the received paging message.

Step 7: Upon discovering an ID identical to the ID of the UE in the received paging message, the UE additionally checks whether the data packet is present.

Step 8: If the UE is aware that the data packet is additionally present in the paging message including an ID identical to the ID thereof, the UE transmits the data packet as well as the paging information to an upper NAS layer of the UE, e.g., an EMM layer.

Step 9: Upon receiving paging, the NAS layer of the UE receives information indicating that the paging has arrived from the RRC layer. In this process, the NAS layer additionally checks whether the data packet has also been received. If the received data packet is present, the NAS layer performs a security removal and decompression process using preset security context information or header compression protocol context information. Next, a decompressed and/or security-removed data packet is delivered to an application.

In Step 9, the data packet delivered to the NAS layer from the RRC layer may conform to a NAS PDU or message structure. For example, the UE may perform decoding on the assumption that the data packet received from the RRC layer is the NAS message.

Step 10: The UE needs to inform a network that the NAS message or the data packet included in the NAS message has been successfully received.

For the UE to inform the network that the NAS message or the data packet included in the NAS message has been successfully received, the NAS layer of the UE may perform the following procedures after Step 9.

The NAS layer may perform a network initiated service request procedure.

The NAS layer may simply make the RRC layer establish an RRC connection. For example, if the data packet is delivered to the NAS layer of the UE together with the paging, the NAS layer may request that the RRC layer send a paging acknowledge in order to inform the network that the data packet and the paging have been successfully received. The RRC layer which is requested to send the paging acknowledgement may perform an RRC connection establishment procedure and set an establishment cause value as a paging response or the paging acknowledgement. The eNB may check whether the establishment cause value in an RRC connection establishment request message received from the UE is set as the paging response or the paging acknowledgement. For the RRC connection establishment request message of which establishment cause is set as the paging response or the paging acknowledgement, the eNB may additionally check an ID included in the RRC message. If the ID included in the RRC message is included in a paging message that the eNB has previously transmitted to each cell and if the eNB includes the data packet for the UE in the paging message, the eNB notifies the MME that paging and data delivery have been successfully performed. If the UE does not make any further request, for example, if the UE informs the eNB that there is no additional data to be transmitted, the eNB transmits an RRC connection reject message to the UE. In this case, the eNB may set a cause value in the RRC connection reject message as a value indicating paging acknowledge has been confirmed. Upon receiving the value indicating that paging acknowledge has been confirmed together with the RRC connection reject message for the RRC connection establishment request message that the UE has transmitted, the UE considers that the paging acknowledgement that the UE has transmitted has been successfully transmitted to the network and does not start the RRC connection establishment procedure unless other reasons for establishing a connection are present. That is, upon receiving the value indicating paging acknowledge has been confirmed together with the RRC connection reject message for the RRC connection establishment request message that the UE has transmitted, the UE may terminate the RRC connection establishment procedure unless other reasons for completing an RRC connection establishment are present. Conventionally, upon receiving an RRC connection message for the RRC connection establishment request message, the UE starts a timer and, if a predetermined time elapses, the UE again starts the RRC connection establishment procedure. However, according to the present invention, the UE does not attempt to automatically perform the RRC connection establishment procedure using the timer even though the UE receives the RRC connection rejection message. If the RRC connection establishment procedure is needed for other reasons, the UE may start the RRC connection establishment procedure. Accordingly, if the eNB sets a cause value as a value indicating that the paging response of the UE has been received and transmits the RRC connection reject message to the UE, the UE may maintain an RRC connection release state unless other reasons are present.

The NAS layer may start a process of transmitting a service request message in order to transmit an acknowledgement for the paging and the data packet. The NAS layer may set a cause value in a NAS message as a value indicating that the paging and the data have been received, and transmit the NAS message. The service request message may be submitted to the RRC layer and the RRC layer may perform the RRC connection establishment procedure. Through the RRC connection establishment procedure, the NAS service request message may be transmitted to the MME and the MME may be aware of whether downlink data has been successfully transmitted by receiving the NAS service request message.

In the step (e.g., Step 8) of FIG. 12, if the UE discovers that the data packet transmitted thereto is included in the paging message including an ID equal to an ID thereof, the RRC layer of the UE may inform the eNB that the UE has successfully received the paging and the data even without a command by the NAS layer. Even in this case, the RRC layer may perform the RRC connection establishment procedure with the eNB and set an establishment cause as, for example, a paging acknowledgement.

Meanwhile, in a general IoT system, a response should be transmitted to an entity that has transmitted the data packet in some cases but the response need not be transmitted in other cases. In consideration of this viewpoint, it may be unnecessary for the UE to transmit a response to the received downlink data at every time. Therefore, the MME or the eNB may provide the UE with information as to whether the UE should transmit an acknowledgement to the MME or the eNB. The UE may be configured such that the UE performs the above-described acknowledgement procedure only when this information indicates that the acknowledgement should be transmitted. Such indication information may be included in the NAS message that the MME transmits to the UE.

Conventionally, the UE sets a cause of the RRC connection request message as a mobile originated service request message or a mobile terminated service request and transmits the RRC connection request message. Meanwhile, according to the present invention, the UE may set the cause of the RRC connection request message as a paging response and transmit the RRC connection request message without the NAS message (i.e., without carrying the NAS message in the container of the RRC connection request message). As in the above-described proposal of the present invention, if the UE transmits the paging response through the RRC connection request message, there is no need to unnecessarily establish a NAS connection between the UE and the network. Therefore, the RRC connection request message including the above-described acknowledgement of the paging and the data packet may serve to inform the eNB that there is no need to establish a connection with the MME.

Conventionally, the RRC layer recognizes the paging and informs the NAS layer of the paging. The NAS layer which is informed by the RRC layer that there is paging transmits a service request and the RRC layer transfers a NAS message corresponding to the service request in a container of the RRC message. In other words, conventionally, the NAS message is transmitted after an RRC connection is established, whereas, according to the present invention, an RRC connection procedure may be ended after only the RRC connection is established. According to the Control Plane CIoT EPS optimization procedure (e.g., refer to FIG. 10) discussed up to now, the NAS message may be carried in an RRC connection setup complete message, whereas, according to the present invention, if only a cause indicating the acknowledgement of the paging and the downlink data is carried in the RRC connection request message, the next procedure may be omitted. For example, according to a conventional paging procedure, upon receiving the paging in step 4 of FIG. 8, the UE performs the service request procedure of FIG. 9 after performing the RRC connection establishment procedure of FIG. 7. However, according to the proposal of the present invention, the UE which has received the paging in step 4 of FIG. 8 may perform only the procedure of FIG. 7 and omit the steps of FIG. 9. Instead, information indicating that the eNB has received the paging message is transmitted to the MME from the eNB.

Figure 13:
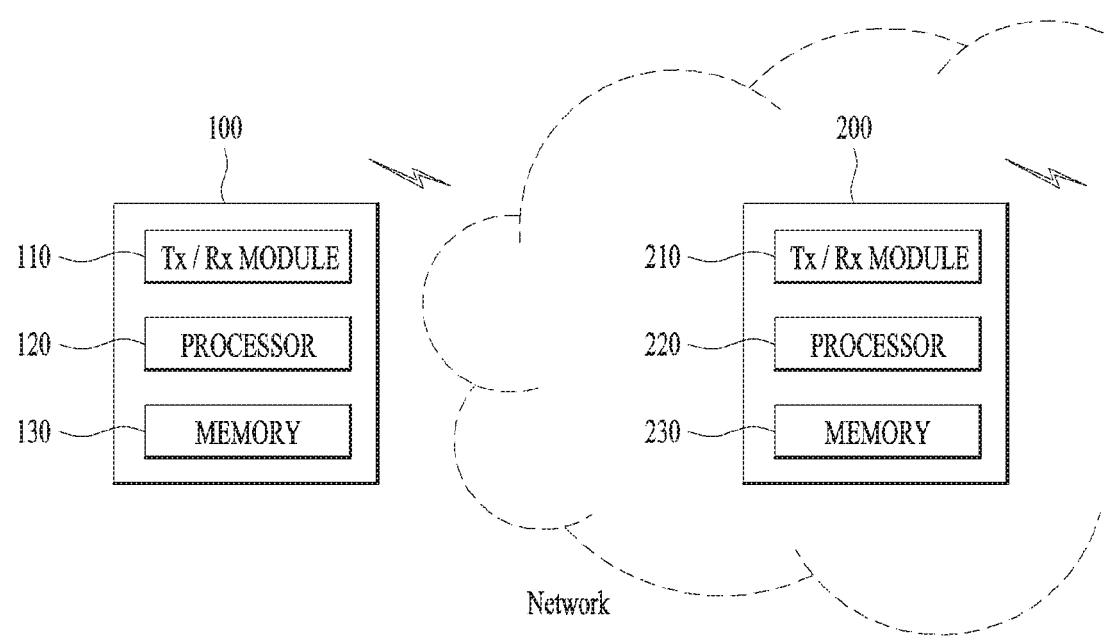
FIG. 13 illustrates a node according to an embodiment of the present invention.

FIG. 13 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 13, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:
1. A method of receiving data by a user equipment from a network in a wireless communication system, the method comprising:
receiving a paging message including a non-access stratum (NAS) message;
based on the NAS message including a data packet of a terminating call for the user equipment, transmitting a radio resource control (RRC) connection request message including acknowledgement information informing an acknowledgement of the data packet;
receiving an RRC connection reject message including information informing that the acknowledgement information is confirmed by the network; and
based on receiving the RRC connection reject message, terminating an RRC connection establishment procedure started by the transmission of the RRC connection request message,
wherein the NAS message further comprises information informing whether the user equipment needs to transmit the acknowledgement or not.

2. The method according to claim 1, further comprising:
delivering, at an RRC layer of the user equipment to a non-access stratum (NAS) layer of the user equipment, paging information in the paging message and the data packet.

3. The method according to claim 1,
wherein the data packet is received through the paging message in a state in which the user equipment is in a discontinuous reception mode or a power saving mode.

4. The method according to claim 1,
wherein the acknowledgment information is included in the RRC connection request message in a state in which the NAS message includes information informing that the user equipment needs to transmit the acknowledgment.

5. A user equipment for receiving data in a wireless communication system, the user equipment comprising:
a transceiver; and
a processor that:
receives a paging message including a non-access stratum (NAS) message;
based on the NAS message including a data packet of a terminating call for the user equipment, transmits a radio resource control (RRC) connection request message including acknowledgement information informing an acknowledgement of the data packet;
receives an RRC connection reject message including information informing that the acknowledgement information is confirmed by the network; and
based on reception of the RRC connection reject message, terminates an RRC connection establishment procedure started by the transmission of the RRC connection request message,
wherein the NAS message further comprises information informing whether the user equipment needs to transmit the acknowledgement or not.

6. The user equipment according to claim 5,
wherein an RRC layer of the processor delivers paging information in the paging message and the data packet to a non-access stratum (NAS) layer of the processor.

7. The user equipment according to claim 5,
wherein the data packet is received through the paging message in a state in which the user equipment is in a discontinuous reception mode or a power saving mode.

8. A method of transmitting data by a base station in a wireless communication system, the method comprising:
transmitting a paging message including a non-access stratum (NAS) message for a user equipment;
receiving a radio resource control (RRC) connection request message from the user equipment;
based on the NAS message including a data packet of a terminating call for the user equipment and the RRC connection request message including acknowledgement information informing an acknowledgement of the data packet, transmitting an RRC connection reject message including information informing that the acknowledgement information is confirmed to the user equipment; and
based on transmitting the RRC connection reject message to the user equipment, terminating an RRC connection establishment procedure started by the reception of the RRC connection request message,
wherein the NAS message further comprises information informing whether the user equipment needs to transmit the acknowledgement or not.

9. The method according to claim 8, further comprising:
receiving the paging message and the data packet from a mobility management entity.

10. The method according to claim 8,
wherein the paging message further includes information informing that the data packet is included in the NAS message.

11. The method according to claim 8,
wherein the data packet is transmitted through the paging message in a state in which the user equipment is in a discontinuous reception mode or a power saving mode.

12. A base station for transmitting data in a wireless communication system, the base station comprising:
a transceiver; and
a processor that:
transmits a paging message including a non-access stratum (NAS) message for a user equipment;
receives a radio resource control (RRC) connection request message from the user equipment;
based on the NAS message including a data packet of a terminating call for the user equipment and the RRC connection request message including acknowledgement information informing an acknowledgement of the data packet, transmits an RRC connection reject message including information informing that the acknowledgement information is confirmed to the user equipment; and
based on transmission of the RRC connection reject message to the user equipment, terminates an RRC connection establishment procedure started by the reception of the RRC connection request message,
wherein the NAS message further comprises information informing whether the user equipment needs to transmit the acknowledgement or not.

13. The base station according to claim 12,
wherein the processor is configured to control the transceiver to receive the paging message and the data packet from a mobility management entity.

14. The base station according to claim 12,
wherein the paging message further includes information informing that the data packet is included in the NAS message.

15. The base station according to claim 12,
wherein the data packet is transmitted through the paging message in a state in which the user equipment is in a discontinuous reception mode or a power saving mode.

* * * * *